(No Model.)
R. VORAS.
ANIMAL TRAP.
No. 592,598. Patented Oct. 26, 1897.
FIG:1.
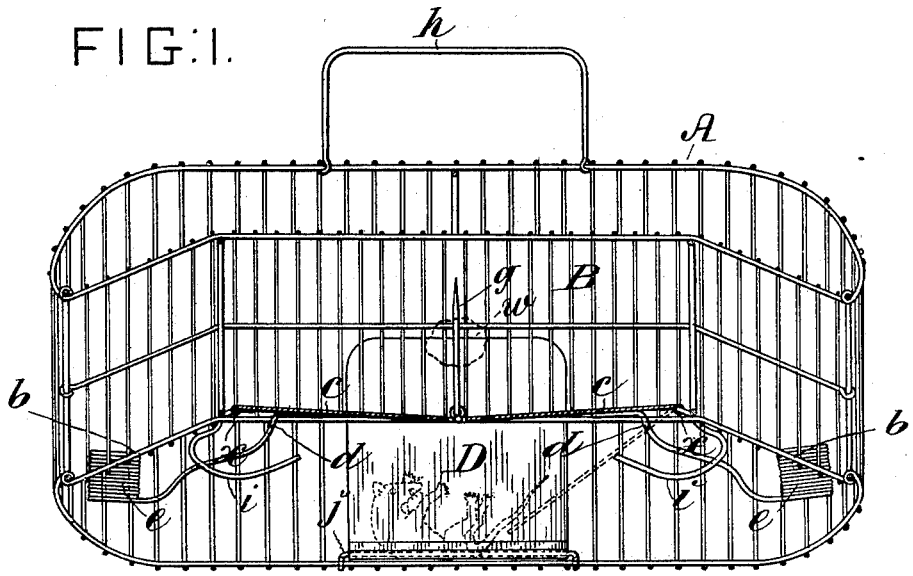
FIG:2.
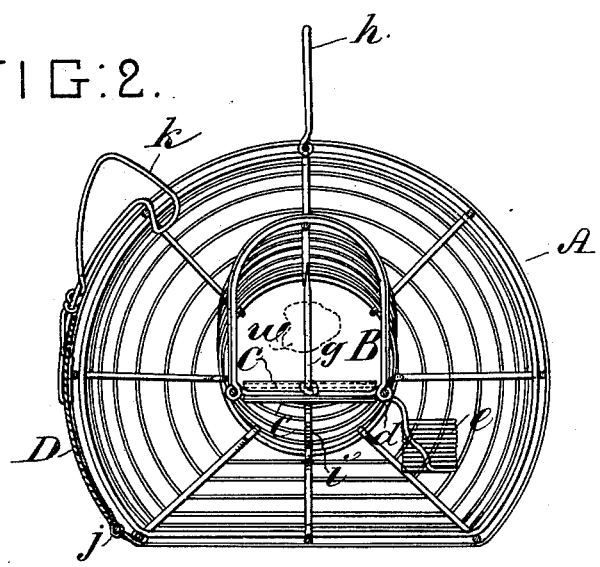
WITNESSES:
INVENTOR
Rudolph Voras,
BY
ATTORNEY

United States Patent Office.

RUDOLPH VORAS, OF NEW YORK, N. Y.

ANIMAL-TRAP.

SPECIFICATION forming part of Letters Patent No. 592,598, dated October 26, 1897.

Application filed June 24, 1897. Serial No. 642,021. (No model.)

*To all whom it may concern:*

Be it known that I, RUDOLPH VORAS, a citizen of the United States, residing in the city, county, and State of New York, have invented certain new and useful Improvements in Animal-Traps, of which the following is a specification.

My invention relates to the class of self-setting animal-traps, and particularly to rat and mouse traps made from wire and having gravity trap-doors; and the object is to provide a trap of simple and inexpensive construction with trap-doors so arranged that the animal, lured by the bait, will inevitably fall through one door or the other if he enters the passage through the trap.

In the accompanying drawings an embodiment of my invention is illustrated, Figure 1 being a longitudinal vertical mid-section of the trap, and Fig. 2 a transverse vertical mid-section of the same.

The trap, as herein shown, is of wire somewhat cylindrical in cross-section, but with a flattened bottom to impart stability, and it is double in the sense that a transverse mid-section divides it into two like halves or sections.

A is the body of the trap, through which extends longitudinally a tubular wire structure forming a tunnel or passage B, which has inclines $b$ at its respective open ends up which the animal may comfortably walk or creep when entering the trap. Practically the entire bottom of the passage B, between the upper ends of the inclines $b$, consists of two like trap-doors $c$, hinged at $x$ at their respective outer ends and at their free inner ends meeting or nearly meeting at the middle of the passage B. The trap-doors $c$ are held up level normally by light counterweights $e$, here shown as conveniently made of a tight coil of wire. They may of course be weights of any kind preferred. To form a limiting stop, the arm bearing the weight $e$ impinges on the wire frame at $d$.

In the center of the trap is fixed an upright wire forming a bait-holder $g$, which projects up into the passage B. In Fig. 1 the bait $w$ is shown in dotted lines on the holder $g$. It may be a bit of meat or cheese placed on the holder with the aid of a fork. The trap may have a wire bail or handle $h$, and wires suitably bent and fixed may be provided to form stops $i$ to limit the depression of the trap-doors.

It will be noted that the tubular tunnel B extends through the body A in such a manner as to leave a clear space about it throughout its entire length, the connection with the body being at the ends only, and that the weights $e$, which support the trap-doors, are in the main body of the trap exterior to the tunnel, so that they will not be interfered with by the animals passing through the tunnel.

The operation is as follows: The trap being baited, the bait lures the animal and he may enter either end of the passage B, running up the incline $b$ at that end. He cannot reach the bait without stepping upon the trap-door at that end, and he may in some cases be launched through to the bottom of the trap at once; but in many instances these animals are very wary, and if one feels the door yielding downward beneath his feet he will spring forward, intending to escape at the farther end of the passage, which he sees is open. In springing forward, however, he will alight with force on the free end of the other trap-door beyond and drop through before he can help himself. Of course in a trap constructed as here shown the same conditions present themselves, no matter which end of the trap the animal enters, and when he has once been launched into the body of the trap all of his efforts to escape will be fruitless. In Fig. 1 one of the trap-doors is shown depressed in dotted lines.

At the side of the trap is a door D to get out the entrapped animals. This door is hinged at $j$ and has a simple spring-clip $k$ to hold it closed.

I am well aware, of course, that it is not new to provide a self-setting trap with a trap-door to close by gravity or by a light spring, and also that it is not new to make such a trap of wire. This I do not claim, but What I do claim as new is—

An animal-trap comprising a body A, and a tubular wire structure extending through said body from end to end forming an open passage B, and having two trap-doors c, hinged at their outer ends and substantially meeting at their inner ends, said trap-doors being each provided with a counterweight within the body of the trap and exterior to the said passage B, substantially as set forth.

In witness whereof I have hereunto signed my name in the presence of two subscribing witnesses.

RUDOLPH VORAS.

Witnesses:
 HENRY CONNETT,
 PETER A. ROSS.